Patented Nov. 28, 1950

2,531,601

UNITED STATES PATENT OFFICE 2,531,601

MERCAPTAN SYNTHESIS

Richmond T. Bell and Carlisle M. Thacker, Highland Park, Ill., assignors to The Pure Oil Company, Chicago, Ill., a corporation of Ohio Application March 23, 1945, Serial No. 584,382

4 Claims. (Cl. 260—609)

This invention relates to the preparation of mercaptans, and more particularly to the synthesis of mercaptans from olefinic hydrocarbons and hydrogen sulfide.

We have discovered that the nature of the mercaptans which are formed by the reaction of polymeric olefins and hydrogen sulfide in the presence of a Friedel-Crafts catalyst depends principally on the nature of the polymeric olefin and the temperature at which the reaction is conducted. If polymeric olefins which are easily depolymerized to olefins or olefin polymers of lower molecular weight, such as triisobutylene, are reacted with hydrogen sulfide in the presence of a Friedel-Crafts catalyst, such as fluoboric acid, mixtures of hydrogen fluoride and boron trifluoride, aluminum chloride, aluminum bromide, and their hydrocarbon complexes, at temperatures above 0° C., and preferably above 25° C., the resulting mercaptan product may be divided into fractions sharply defined as to boiling range corresponding to monomeric, dimeric, trimeric, etc. olefins. For example in the case of triisobutylene, dodecyl mercaptans, octyl mercaptans and butyl mercaptans are formed. At lower temperatures, however, the formation of the lower mercaptans is suppressed with larger amounts of mercaptans having a number of carbon atoms corresponding to the olefin charged being formed.

On the other hand, certain other types of dodecyl olefins, such as copolymer resulting from the polymerization of a mixture of normal- and iso-butylenes in the presence of solid phosphoric acid catalyst under superatmospheric pressure and at temperatures of approximately 150–200° C., yield substantially no butyl mercaptans and only small amounts of other mercaptans lower in molecular weight than the charge when reacted with hydrogen sulfide in the presence of a Friedel-Crafts catalyst at temperatures up to approximately 100° C.

Thus where it is desired to prepare mercaptans containing a lesser number of carbon atoms per molecule than present in the olefin charge and readily separable, one molecular weight from another, and from other reaction products or unconverted hydrocarbons, branched chain olefin polymers should be used, preferably those formed under mild conditions such as, for example polymerization of isobutylene at temperatures below 100° F. in the presence of 65% sulfuric acid, from branched chain olefins and containing true multiples of the parent olefin or containing at least one carbon atom attached to four other carbon atoms.

Figure 1:
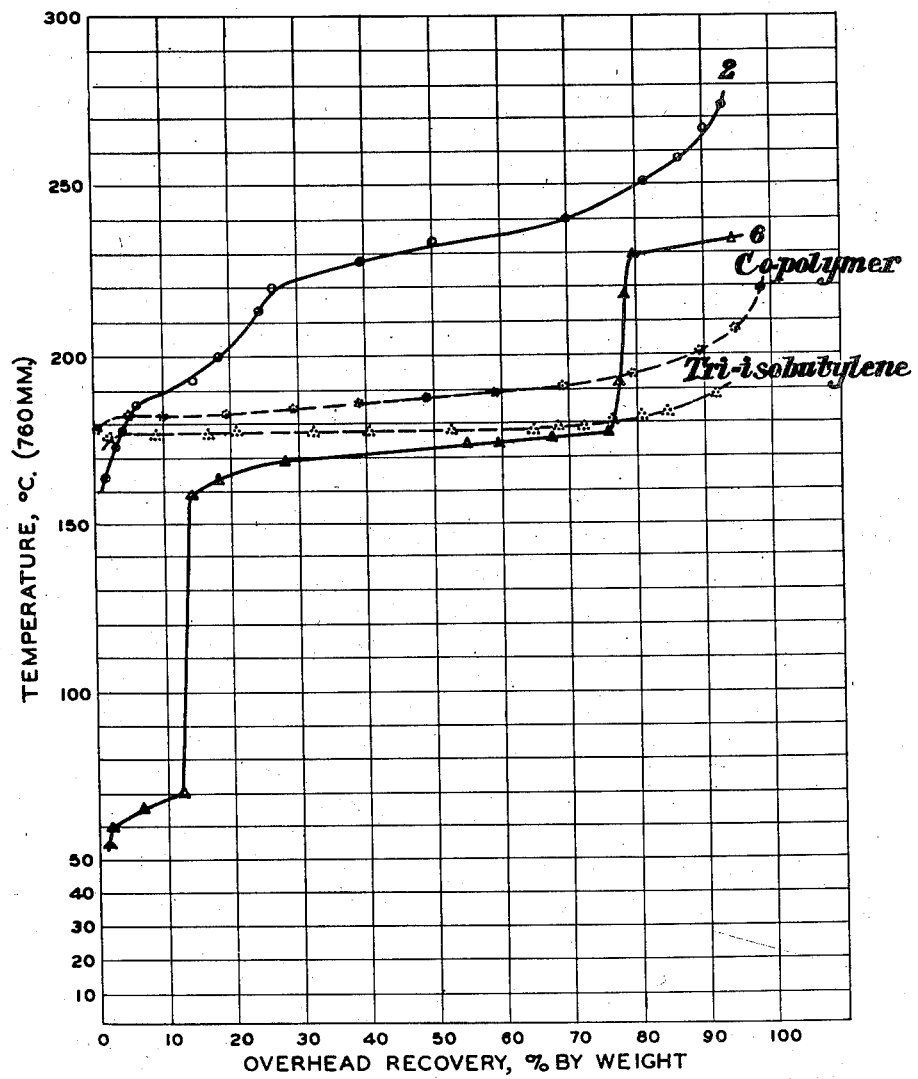
Figure 2:
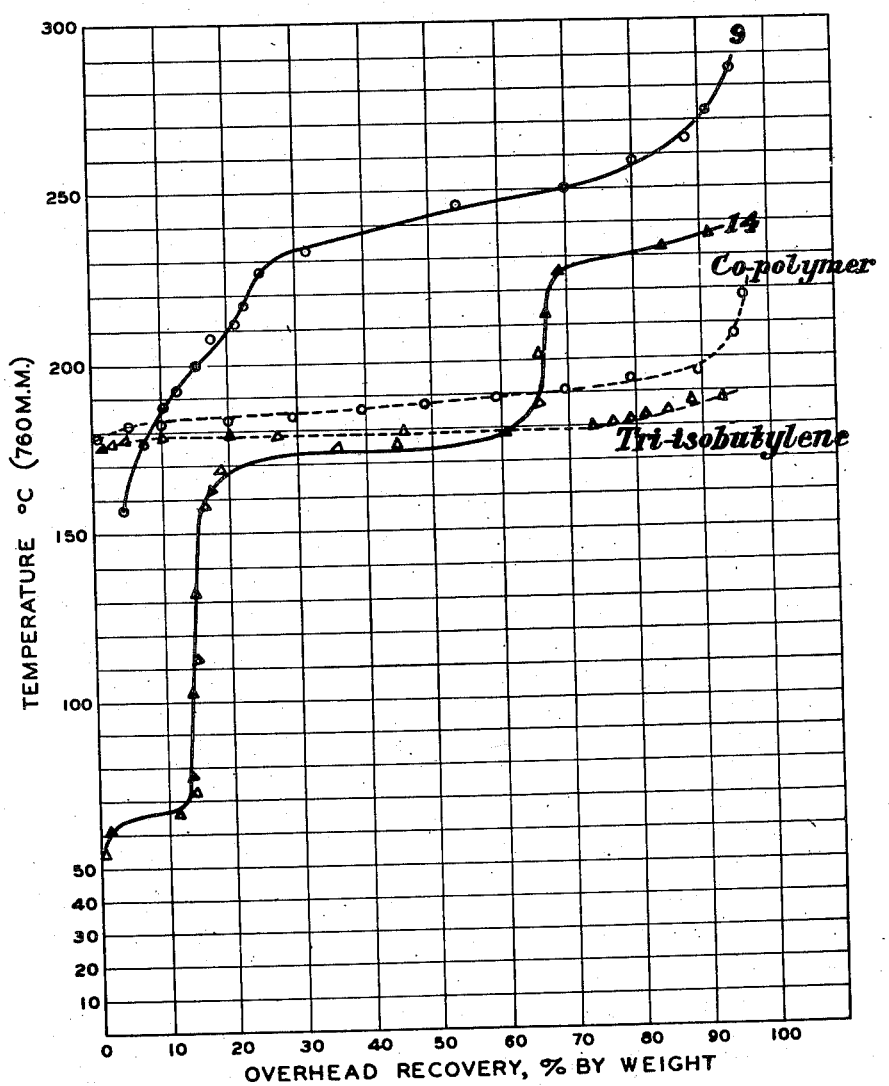
Figure 3:
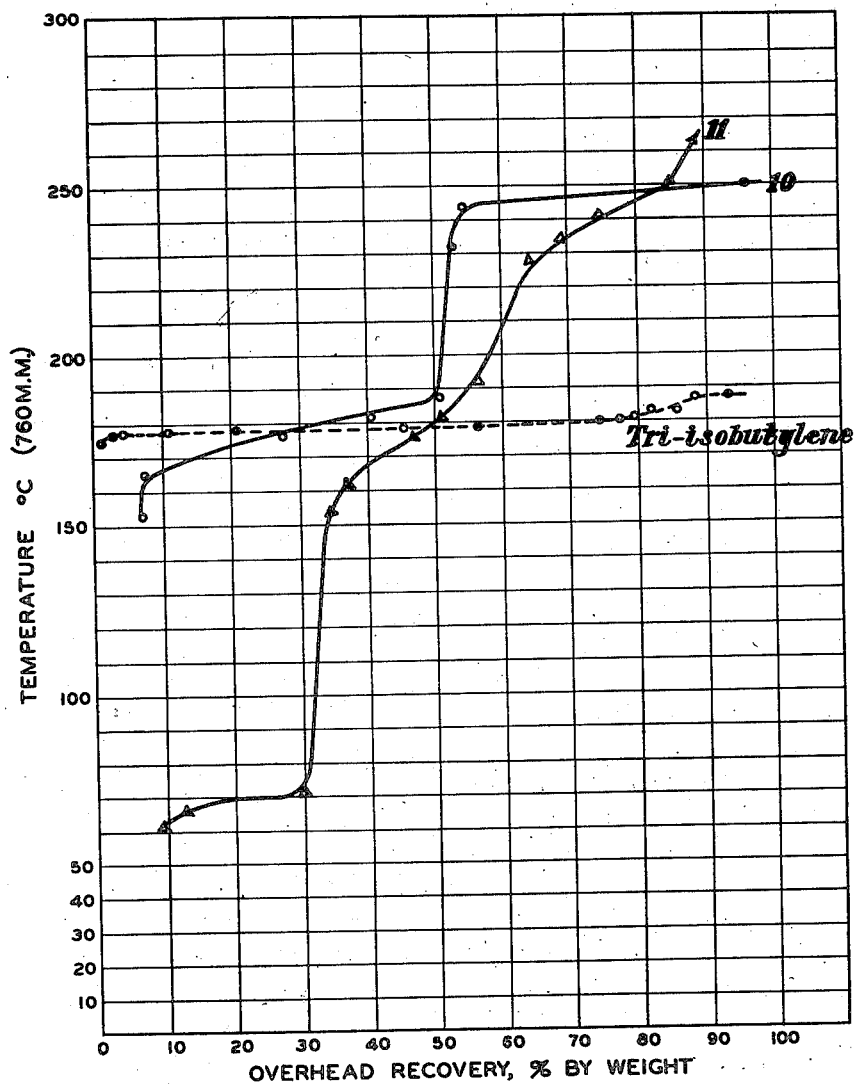

The invention will be more fully understood from the following description and the accompanying drawings of which Figures 1, 2 and 3 are graphs showing distillation curves on various copolymers and triisobutylenes used as charging stock in the preparation of mercaptans, and on various products and reaction products extracts resulting from the mercaptan synthesis.

The reaction of polymeric olefins and hydrogen sulfide in the presence of a Friedel-Crafts catalyst, such as anhydrous aluminum chloride, may be carried out at temperatures of from approximately −30 to 100° C., depending on the nature of the reaction product desired, and depending on the nature of the charging stock. Where the charging stock is an easily depolymerized polymeric olefin, and it is desired to synthesize mercaptans of substantially the same number of carbon atoms as the number of carbon atoms contained in the olefin, temperatures below 25° C., and preferably approximating 0° C. or lower, should be used. Where it is desired to prepare mercaptans having a lesser number of carbon atoms in the molecule than contained in such an olefin, temperatures above 25° C. should be used, and preferably between 50° and 100° C. Although the yield of lower boiling mercaptans increases as the temperature of reaction approaches 100° C., it is preferred not to use temperatures of this magnitude since the yield of mercaptan measured in terms of mercaptan sulfur reaches a maximum at approximately 45–80° C.

In synthesizing mercaptans from olefins other than those easily depolymerized, temperatures ranging from approximately −30° to 100° C. also may be employed, but temperatures of approximately 25–80° C. are preferably used, since highest yields are obtained within this range of temperature without substantial formation of mercaptans having a lesser number of carbon atoms than the olefin used as charging stock and existing in well-defined groups with respect to boiling range and molecular weight.

It is recognized that specific catalysts differ somewhat in activity and that with a less active catalyst than aluminum chloride, as for example, a mixture of anhydrous boron trifluoride and hydrogen fluoride, optimum conversion to desired products may require higher temperatures than those hereinbefore set forth, whereas with a more active catalyst, such as anhydrous aluminum bromide, optimum conversion may require lower temperatures.

Although the process may be carried out at any desired pressure, when it is desired to prepare mercaptans having a lesser number of carbon atoms in the molecule than the olefinic charging stock, it is preferred to operate the process at a pressure of 100–200 pounds per square inch, and preferably at a pressure of about 150 pounds per square inch. It has been found that pressures within the range specified materially increase the production of both butyl and octyl mercaptans from triisobutylene and that no advantage is gained by operating at higher pressures.

In order to demonstrate the invention a series of runs was made in which mercaptans were synthesized from triisobutylene and from copolymer by mixing the olefinic stock with anhydrous aluminum chloride in the presence of hydrogen sulfide. Copolymer was prepared from a close cut $C_4$ gas fraction from an oil cracking operation, containing butanes, butylenes and isobutylenes, by passing the gas through a solid phosphoric acid catalyst at a temperature of approximately 160–170° C. and a pressure of approximately 600–800 pounds per square inch. Triisobutylene was prepared by contacting the $C_4$ gas fraction from an oil cracking operation with 65–70% by weight sulfuric acid at a temperature of about 15–20° C. and then heating the fat acid to a temperature of approximately 110° C. under pressure in order to polymerize the isobutylene absorbed therein. The conditions under which the various runs were made are set forth in Table I:

indicated by reference numbers 9, 10, 11 and 14 was extracted with potassium hydroxide-methanol solution containing 5–30% of water in order to effect a separation between the major portion of unreacted hydrocarbons and the mercaptans, and the mercaptan sulfur content of the extract is reported in the table.

The several reaction products and extracts were subjected to fractional distillation. In general, the fractional distillation was conducted in glass laboratory distilling and fractionating apparatus. The still was run at atmospheric pressure until the bottom temperature reached 100–125° C. at which time distillation was stopped and the still allowed to cool, and nitrogen was drawn through the still during the cooling period. A vacuum between 2 to 10 mm. of mercury was then drawn on the still and fractionation continued at this pressure. Distillation was made at the rate of approximately 1 to 2 cc. per minute and 5° C. fractions were taken except where temperature increase was rapid and the amount of distillate recovered during the interval was too small. The distillate was washed with sodium carbonate to remove acidity and blends of the fractions were made according to plateaus and boiling points in the distillation curve.

Table II gives the molecular weight, mercaptan

Table I

| Ref. No. | Olefinic Charging Stock | Pressure Gage, p. s. i. | Temp., °C. | Contact Time, Hrs. | Mole Ratio Olefinic Chg. Stock to AlCl₃ for unit chge. | Per Cent RSH-S in Reaction Product | Per Cent RSH-S in Mercaptan Extract |
|---|---|---|---|---|---|---|---|
| 2 | Copolymer from mixed butylenes | atm. | 25 | 1.00 | 3.00 | 10.0 | |
| 5 | Triisobutylene | 150, 180 | 26 | 0.25 | 3.00 | ¹ 21.0 | |
| 6 | ...do | 60 | 25 | 1.00 | 3.00 | 11.7 | |
| 9 | Copolymer from mixed butylenes | atm. | 47 | 1.0 | 3.00 | | 11.9 |
| 10 | Triisobutylene | atm. | 1 | 0.5 | 3.00 | | 13.4 |
| 11 | ...do | atm. | 100 | 0.5 | 3.00 | | 17.1 |
| 14 | ...do | atm. | 25 | 1.00 | 4.5–7 | | ² 15.7 |

¹ This product was a composite of two unit products from different runs taken when catalytic activity was high, one from a run at 150 p. s. i. and the other from a run at 180 p. s. i.
² This extract was from a composite comprising the reaction products of three runs under conditions which were substantially the same, except for variation of 4.5 to 7.0 in mole ratio of olefin to AlCl₃ per unit charge.

The runs were all made in an iron or stainless steel batch reactor of about 600–800 cc. capacity equipped with a mechanical stirrer, a cover, suitable inlet and outlet pipes and a heating and cooling jacket.

The mercaptan sulfur content of the reaction product from the runs indicated by reference numerals 2, 5 and 6, was determined and is reported in the table. The reaction product from runs sulfur content and the percent by weight based on charge, of different fractions of the reaction products and extracts in Table I. The fractions correspond roughly to the boiling ranges for dodecyl mercaptans, octyl mercaptans and butyl mercaptans. The theoretical boiling ranges, molecular weights and mercaptan sulfur contents for total octyl and butyl mercaptans are also given in the table:

Table II

| Ref. No. | Component | Per Cent by Wt. of charge | Boiling Range, °C. | Molecular Weight | Mercaptan Sulfur Content |
|---|---|---|---|---|---|
| 9 | 1. Dodecyl and Higher ¹ | 75 | Above 225 | | |
| | 1a. Fraction of (1) Tested | 69.9 | 226–285 | | |
| | 2. Octyl or Intermediate ² | 20 | 156–225 | | |
| | 2a. Fraction of (2) Tested | | | 190 | 13.2 |
| | 3. Butyl and Lower ³ | 5 | Below 156 | | |
| | 3a. Fraction of (3) Tested | | | | |
| | 4. Not included | 0 | | | |
| 14 | 1. Dodecyl and Higher ¹ | 31 | Above 225 | | |
| | 1a. Fraction of (1) Tested | 24.3 | 213–236 | | |
| | 2. Octyl or Intermediate ² | 45 | 165–180 | 191 | 13.9 |
| | 2a. Fraction of (2) Tested | 35.7 | 162–172 | 143 | 14.3 |
| | 3. Butyl and Lower ³ | 14 | Below 85 | | |
| | 3a. Fraction of (3) Tested | 11.7 | 61–71 | 86 | 34.0 |
| | 4. Not Included | 10 | | | |
| 2 | 1. Dodecyl and Higher ¹ | 68 | Above 225 | | |
| | 1a. Fraction of (1) Tested | 66.6 | 220–274 | | |
| | 2. Octyl or Intermediate ² | 30 | 164–225 | 193 | 12.9 |
| | 2a. Fraction of (2) Tested | | | | |
| | 3. Butyl and Lower ³ | 2 | Below 164 | | |
| | 3a. Fraction of (3) Tested | | | | |
| | 4. Not Included | 0 | | | |

See footnotes at end of table.

Table II—Continued

| Ref. No. | Component | Per Cent by Wt. of charge | Boiling Range, °C. | Molecular Weight | Mercaptan Sulfur Content |
|---|---|---|---|---|---|
| 6 | 1. Dodecyl and Higher [1] | 21 | Above 225 | | |
| | 1a. Fraction of (1) Tested | 16.0 | 218–234 | 183 | 13.0 |
| | 2. Octyl or Intermediate [2] | 58 | 160–180 | | |
| | 2a. Fraction of (2) Tested | 61.8 | 159–182 | 155 | 11.7 |
| | 3. Butyl and Lower [3] | 13 | Below 85 | | |
| | 3a. Fraction of (3) Tested | 10.7 | 60–70 | 87 | 32.7 |
| | 4. Not Included | 7 | | | |
| 5 | 1. Dodecyl and Higher [1] | 21 | Above 225 | | |
| | 1a. Fraction of (1) Tested | 18.3 | 218–237 | 187 | 13.0 |
| | 2. Octyl or Intermediate [2] | 42 | 145–180 | | |
| | 2a. Fraction of (2) Tested | 34 | 150–170 | 138 | 19.9 |
| | 3. Butyl and Lower [3] | 30 | Below 85 | | |
| | 3a. Fraction of (3) Tested | 22.4 | 60–65 | 89 | 34.0 |
| | 4. Not Included | 7 | | | |
| 10 | 1. Dodecyl and Higher [1] | 46 | Above 240 | | |
| | 1a. Fraction of (1) Tested | 43.2 | 232–250 | 187 | 15.4 |
| | 2. Octyl or Intermediate [2] | 42 | 163–188 | | |
| | 2a. Fraction of (2) Tested | 42.8 | 165–188 | 152 | 14.8 |
| | 3. Butyl and Lower [3] | 8 | Below 163 | | |
| | 3a. Fraction of (3) Tested | | | | |
| | 4. Not Included | 4 | | | |
| 11 | 1. Dodecyl and Higher [1] | 26 | Above 240 | | |
| | 1a. Fraction of (1) Tested | 24.5 | 228–264 | 195 | 12.0 |
| | 2. Octyl or Intermediate [2] | 39 | 155–240 | | |
| | 2a. Fraction of (2) Tested | 18.9 | 162–192 | 146 | 13.7 |
| | 3. Butyl and Lower [3] | 32 | Below 85 | | |
| | 3a. Fraction of (3) Tested | 23.6 | 61–71 | 87 | 33.5 |
| | 4. Not Included | 3 | | | |
| Dodecyl Mercaptans | | | 225–273 | 202 | 15.8 |
| Octyl Mercaptans | | | 160–199 | 146 | 21.9 |
| Butyl Mercaptans | | | 62–99 | 90 | 35.6 |

[1] Includes residue.
[2] Includes unconverted dodecenes.
[3] Includes secondary recovery and loss.

From the molecular weights in Table II it is apparent that the fraction corresponding to dodecyl mercaptans in all cases had a molecular weight slightly below that of the dodecyl mercaptans. This can be accounted for by the fact that hydrocarbons were present in the fraction. The lower mercaptan sulfur content of these fractions is also due to the fact that some hydrocarbon was present in the mixture. The highest yield of fraction boiling over the range of dodecyl mercaptans and higher was obtained in the case of reference number 9 where about 75.0% of mercaptan product from a copolymer charging stock consisted of dodecyl and higher-boiling mercaptans, although the temperature at which this synthesis was carried out, namely 47° C., was higher than the temperature of any triisobutylene run with the exception of reference number 11. As indicated by the table and as will be subsequently pointed out, the butyl mercaptan content of reference number 9 was substantially nil.

The table does not show tests for selected fractions approximating the octyl mercaptan boiling range for products made from copolymer charging stock since no well-defined plateau was obtained during distillation of these products. With regard to the octyl mercaptan fraction in a product made from triisobutylene it will be apparent that although the molecular weight was in general very close to the molecular weight of octyl mercaptan, or higher, the mercaptan sulfur in every case, except reference number 5, was materially lower than the mercaptan sulfur content of octyl mercaptans, showing that this fraction contained a large portion of unconverted hydrocarbons. Reference number 5 was prepared under pressures of approximately 150 and 180 pounds per square inch, resulting in much higher conversion of olefins to both butyl and octyl mercaptans.

The fraction corresponding to butyl mercaptans in general showed a molecular weight slightly below that for butyl mercaptans and a mercaptan sulfur content which approached fairly closely to that for butyl mercaptans, thus indicating that this fraction contained only a small per cent of unconverted hydrocarbons. It is significant also that the highest yields of butyl mercaptan fraction were obtained in runs designated by reference numerals 11 and 5, showing that both high temperature, and superatmospheric pressure in the neighborhood of 150 are favorable to high yields of butyl mercaptans. It was determined that the selected butyl mercaptan fraction tested was chiefly tertiary butyl mercaptan.

In order to further demonstrate the effect of charging stock, temperature and pressure on the nature of the mercaptans produced, a series of curves were plotted with distillation temperatures as ordinates and per cents by weight overhead recovery as abscissae. Figure 1 shows the distillation curve 2 for the reaction product obtained in the run designated by reference number 2. Temperatures were converted to a basis of 760 mm. of mercury by means of the nomograph of Watson & Wirth Industrial & Engineering Chemistry, Analytical edition 7, No. 1, page 72 (1935). The charging stock in this run was copolymer, and as shown by the curve there is no well-defined plateau and very little lower boiling mercaptans were prepared. The fact that the curve begins at 165° C. shows that there were no butyl mercaptans present.

Curve number 6 is the distillation curve of the product obtained in the run designated as reference number 6, in which triisobutylene was used as charging stock. The curve indicates the presence of butyl mercaptans and shows a decided plateau at about 165–175° C.

The curves showing the distillation range for the copolymer and triisobutylene used as charging stocks for making the mercaptans in runs designated 2 and 6, are also shown on the graph.

In Figure 2 the curves for the extract designated as reference number 9 and extract designated as reference number 14 are plotted and indicated as 9 and 14, respectively. The extract obtained in run designated by reference number 9 was prepared from copolymer. This extract contained no butyl mercaptans since its initial boiling point was 155° C., and has no well-defined plateau at any point in the curve.

On the other hand, the extract designated as reference number 14 has a well-defined plateau at approximately 65° C., and another well-defined plateau at approximately 170–180° C., thus indicating substantial amounts of butyl and octyl mercaptans in the extract. The curves for the copolymer and triisobutylene charging stock used in making the mercaptans are included in Figure 2.

In Figure 3 are plotted curves 10 and 11 for the extracts designated by reference numbers 10 and 11, respectively. Both extracts were prepared from triisobutylene charging stock. The extract designated by reference numeral 10, however, was prepared at 1° C., and as shown by the curve there were substantially no butyl mercaptans present in the extract, although there were large amounts of octyl and dodecyl mercaptans present. The extract designated by numeral 11 was prepared from triisobutylene at 100° C. A considerable amount of butyl mercaptans is present in the extract as shown by the plateau in the curve between approximately 60 and 70° C. The distillation curve for triisobutylene used as charging stock in the preparation of this product is also plotted in the drawing.

It will be seen, therefore, that by starting with an easily depolymerized olefin, particularly triisobutylene, mercaptans having substantially the same number of carbon atoms in the molecule as the olefin can be synthesized in the presence of a Friedel-Crafts catalyst, particularly anhydrous aluminum chloride, by holding reaction temperature below 25° C., and preferably at approximately 0° C., or lower, and that lower boiling mercaptans can be synthesized by holding the reaction temperature at approximately 25° C., or higher, and preferably at 50–80° C., under superatmospheric pressure of the order of 100–200 pounds per square inch, and preferably about 150 pounds per square inch. Under the same conditions, olefins or olefin polymers other than easily depolymerized polymers of branched chain olefins yield chiefly mercaptans having the same number of carbon atoms as the olefin charged.

This application is a continuation-in-part of our application Serial No. 516,548, filed December 31, 1943, now U. S. Patent No. 2,447,481, entitled "Synthesis of Organic Sulfur Compounds."

It is claimed:

1. The method of preparing mercaptans from polymeric olefins which are copolymers of different monomers, without material depolymerization of the olefin comprising, reacting the olefins and hydrogen sulfide in the presence of a catalyst consisting of a Friedel-Crafts catalyst and a temperature in the range from about 25° to 80° C.

2. The method in accordance with claim 1 in which the reaction is carried out at temperatures in the range from about 50° to 75° C., and at pressures from about 100 to 200 pounds per square inch.

3. The method in accordance with claim 1 in which the olefin is a copolymer of mixed butylenes.

4. The method in accordance with claim 2 in which the olefin is a copolymer of mixed butylenes.

RICHMOND T. BELL.
CARLISLE M. THACKER.

REFERENCES CITED

The following references are of record in the file of this patent:

UNITED STATES PATENTS

| Number | Name | Date |
| --- | --- | --- |
| 2,052,268 | Williams | Aug. 25, 1936 |
| 2,101,096 | Reuter | Dec. 7, 1937 |
| 2,296,399 | Otto | Sept. 22, 1942 |
| 2,352,435 | Hoeffelman | June 22, 1944 |
| 2,366,453 | Meadow | Jan. 2, 1945 |
| 2,434,510 | Olin | Jan. 13, 1948 |